United States Patent [19]

Guanella et al.

[11] 3,925,612

[45] Dec. 9, 1975

[54] DIGITAL SCRAMBLING APPARATUS FOR USE IN PULSED SIGNAL TRANSMISSION

[75] Inventors: Gustav Guanella, Zurich; Rudolf Schweizer, Wettingen, both of Switzerland

[73] Assignee: Patelhold Patentverwertungs-& Elektro-Holding A.G., Glarus, Switzerland

[22] Filed: Jan. 24, 1964

[21] Appl. No.: 339,953

[30] Foreign Application Priority Data

Jan. 30, 1963 Switzerland ........................ 1165/63

[52] U.S. Cl. ................................ 178/22; 179/1.5 R

[51] Int. Cl.² ........................ H04L 9/00; H04K 1/02

[58] Field of Search ........................ 178/22, 5.1, 122; 340/146.1; 331/78; 328/37; 325/32, 340/122; 179/1.5

[56] References Cited

UNITED STATES PATENTS 3,069,657 12/1962 Green, Jr. et al. ............... 340/146.1

3,093,796 6/1963 Westerfield .......................... 328/37

*Primary Examiner*—T. H. Tubbesing
*Assistant Examiner*—H. A. Birmiel
*Attorney, Agent, or Firm*—Orville N. Greene; Frank L. Durr

EXEMPLARY CLAIM

1. In combination, a secrecy signaling system for transmitting a polarity modulated message pulse series from a transmitting station to a receiving station including scrambling pulse generating means at both said stations, to produce a pair of identical scrambling pulse series, for scrambling and unscrambling, respectively, said message pulse series, scrambling pulse converting means at each of said stations to convert a scrambling control pulse series of arbitrarily varying polarity into a final scrambling pulse series, said converting means comprising a pulse shift register having a plurality of cascade-connected pulse storage stages and an input fed by said control pulse series, at least one feedback circuit connecting the output of a first one of said stages to the input of a second preceding stage of said register, and at least one logical circuit interposed in the path of said feedback circuit, to produce final scrambled pulses at the output of said register.

17 Claims, 13 Drawing Figures

INVENTORS
GUSTAV GUANELLA &
RUDOLF SCHWEIZER
BY
[signature]
ATTORNEY

INVENTORS
GUSTAV GUANELLA &
RUDOLF SCHWEIZER
BY
Karl Flaum
ATTORNEY

FIG. 9a.
| n | u | a | b | c | r |
|---|---|---|---|---|---|
| 0 | + | − | + | + | + |
| 1 | − | + | − | − | + |
| 2 | − | − | − | − | − |
| 3 | − | + | + | + | − |
| 4 | + | + | − | + | − |
FIG. 9b.
| n | u | a | b | c | r |
|---|---|---|---|---|---|
| 0 | ⊖ | − | + | + | + |
| 1 | − | ⊖ | ⊕ | − | + |
| 2 | − | − | ⊕ | − | − |
| 3 | − | + | + | ⊖ | − |
| 4 | + | + | − | + | − |
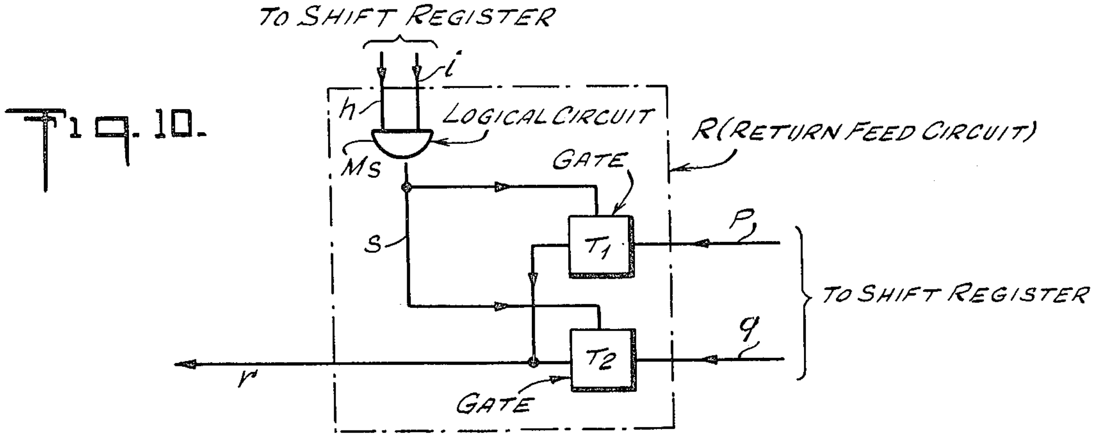
FIG. 10.
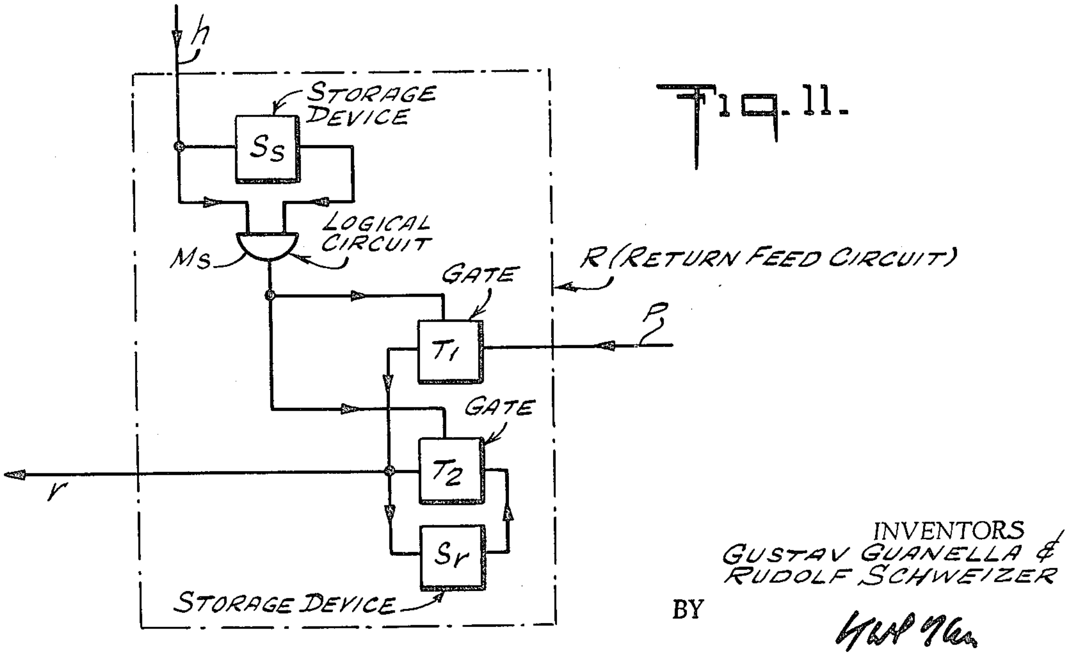
FIG. 11.
INVENTORS
GUSTAV GUANELLA &
RUDOLF SCHWEIZER
BY
ATTORNEY

INVENTORS
GUSTAV GUANELLA &
RUDOLF SCHWEIZER
BY
ATTORNEY

DIGITAL SCRAMBLING APPARATUS FOR USE IN PULSED SIGNAL TRANSMISSION

The invention relates to a digital scrambling apparatus for use in connection with pulsed signal communication of the general type disclosed by U.S. Pat. No. 3,077,518, wherein a primary scrambling or control pulse sequence is converted by means of logical circuit elements and of a storage or memory chain or register comprising a number of storage units, into a coding or scrambling pulse sequence by the polarity of each code pulse being determined by the polarities of a plurality of preceding control pulses supplied to the storage chain. The thus produced scrambling pulse series at the transmitter, being duplicated at the receiver, is combined with the message pulse series at both the transmitter and receiver for scrambling and unscrambling respectively, the message pulses, in a manner well known in connection with secrecy signaling systems of this type. The main element of such scrambling generators takes the form of storage or delay systems which have a number of taps and which can be built up, for instance, from magnetic storage elements or bistable trigger circuits, in the form of well-known shift registers.

A disadvantage of the known arrangements for producing a scrambling pulse series is that complicated delay systems or storage elements — i.e., long storage chains or registers having a large number of storage units — must be provided to prevent repetitive patterns in the scrambling pulse sequence which may enable the scrambled message signals to be monitored or unscrambled by unauthorised persons.

Accordingly, an important object of the present invention is the provision of an improved digital signal scrambling arrangement of the type referred to by which the foregoing and related drawbacks and difficulties inherent in the known scrambling or secrecy arrangements are substantially overcome.

A more specific object of the invention is the provision of a digital scrambling and unscrambling arrangement which, while being extremely simple in construction and design, is highly efficient in ensuring a positive and practically absolute secrecy or safety against deciphering or unscrambling of a message by unauthorized receivers.

Yet another object of the invention is the provision of simple and effective means in connection with a digital scrambling pulse generating arrangement of the type referred to by which the effects of interfering or error pulses are substantially eliminated or minimized.

The invention, both as to the foregoing and ancillary objects as well as novel aspects thereof, will be better understood from the following detailed description, taken in conjunction with the accompanying drawings forming part of this specification and in which.

Figure 12:
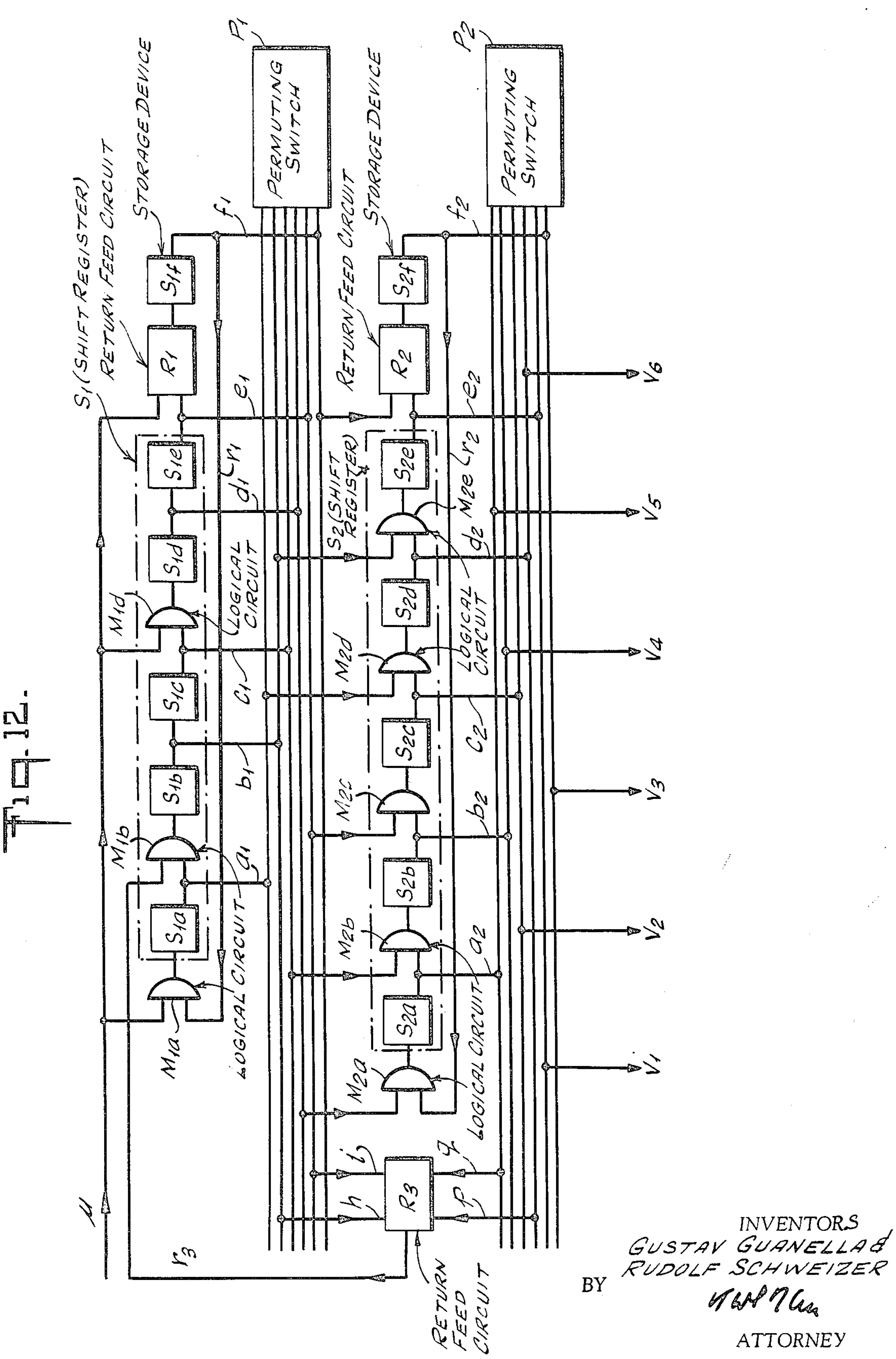

FIGS. 9*a* and 9*b* are tables illustrative of the function of the error pulse suppression according to the invention;

FIGS. 10 and 11 show alternative error pulse suppression means for use in connection with a scrambling pulse generator according to the invention; and FIG. 12 shows a scrambling pulse generating system comprising a plurality of digital scrambling devices in cascade according to the invention.

Like reference characters denote like parts and magnitudes throughout the different views of the drawings.

With the foregoing objects in view, the invention, in accordance with one of its aspects, involves generally the provision of a scrambling pulse generator of the type referred to being designed to involve an extra control of the control pulse polarity in that the output of one storage unit or the outputs of a number of storage units or stages of a storage chain or shift register is or are connected via a feedback or return feed circuit to a logical circuit element or arrangement disposed either at the input of the storage chain or between two preceding storage units or stages thereof. Furthermore, in order to obviate or eliminate the effect of error pulses, the return feed circuit comprises means to cause an irregular sequence of a fractional number of derived feedback pulses to have no effect on the polarity of the output pulses of the return feed circuit, in such a manner as to eliminate the effect of an error pulse on the signal or message pulses in a relatively short time period, as will become further apparent as the following description proceeds in reference to the drawings.

Figure 1:
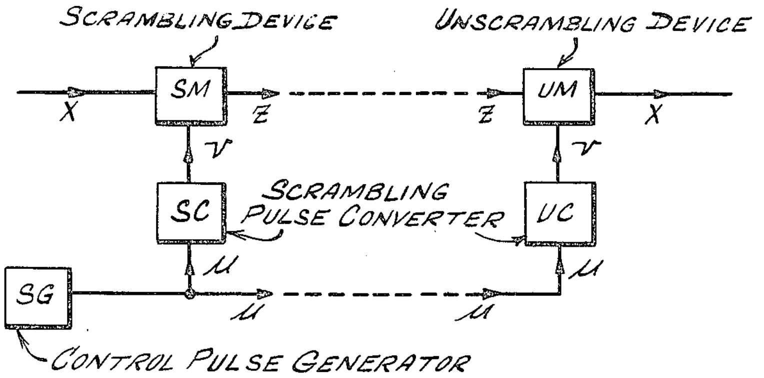
FIGS. 1 and 2 are block diagrams illustrating secrecy signaling systems including different forms of scrambling and unscrambling circuits of the general type forming the subject of the invention.

Referring more particularly to FIG. 1, a message or information signal $x$ in the form of a pulse series is to be scrambled and transmitted from a transmitting site at the left to a receiving site at the right of the figure through any known transmission medium or link. This signal is mixed or combined in the scrambling device or modulator SM at the transmitter with the scrambling signal or pulse series v and the signal $z$, resulting from this mixture, is transmitted to the receiver where the signal is separated from said scrambling signal by means of an identical unscrambling or modulating device UM also being controlled by the signal $v$. The latter is generated at both the transmitter and receiver by the scrambling and unscrambling pulse converters SC and UC, respectively, controlled according to identical rules or programs from a basic scrambling or control signal pulse series u. The signal u, in the example shown, originates from the signal generator SG at the transmitter and is fed to both the scrambling signal converter SC at the transmitter and to the signal converter UC at the receiver through a special transmission line.

The control signal or pulse series u may be derived, for instance, from a noise potential whose instantaneous values appearing at certain times serves to influence a parameter of a pulse signal generator or oscillator, to result in a control signal or pulse series of arbitrarily varying polarity.

In a variation of the arrangement shown by FIG. 1, the generator SG may be located at the receiver site or at any other suitable point, such as, for instance, centrally to simultaneously feed a plurality of transmitters and receivers.

Figure 2:
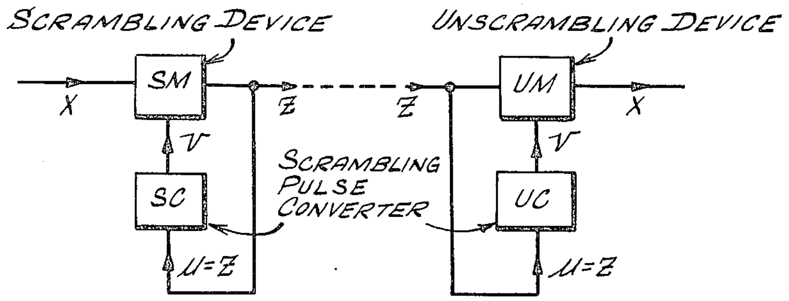

According to the FIG. 2 modification of a secrecy signaling system, the signal $z$ produced by mixing the message pulse series $x$ with the scrambling pulse series v is utilized as the scrambling control signal in that the output or mixed signal $z$ is, besides being transmitted to the receiver, fed to the scrambling pulse generators SC and UC respectively, whereby to dispense with a separate control pulse signal generator SG and transmission of the control pulses, as in the case of FIG. 1.

Figure 3:
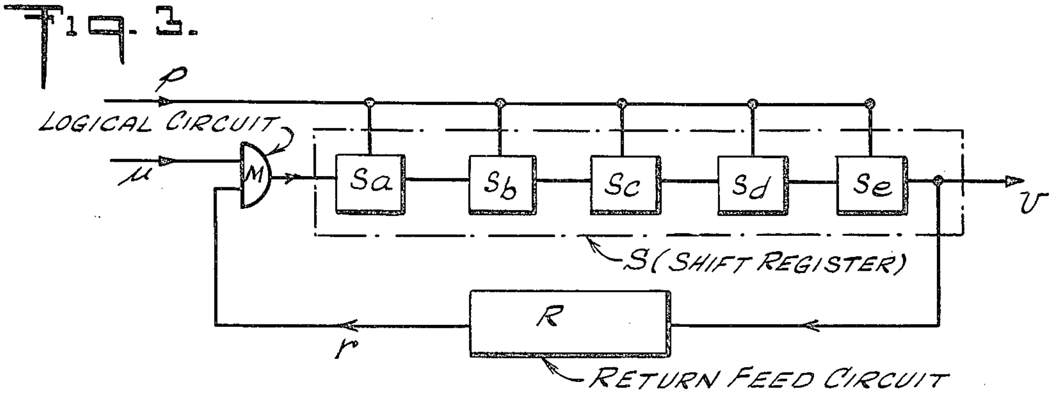
FIGS. 3 and 4 illustrate, by way of example and in block diagram form, basic arrangements of scrambling pulse generating means embodying the principles of the invention.

Referring to FIG. 3, which shows the basic diagram of the digital scrambling device according to the invention, a storage chain S comprises storage units $S_a$, $S_b$, $S_c$, $S_d$, $S_e$. The number of storage units can of course vary. The chain S is constructed, for instance, in the form of a shift register having individual stages, whereby pulses u supplied to the shift register input pass through the register from stage to stage by the application of control pulses $p$, in a manner well known. Other storage arrangements are possible, such as a memory matrix in which the supply and removal of the pulses are controlled by logical circuit elements. Several storage chains of this kind are disclosed by the aforementioned U.S. Pat. No. 3,077,518.

The storage chain and other logical circuit elements (not shown) convert a control pulse sequence $u$ into a scrambling pulse sequence $v$. The discrete pulses of these two pulse sequences may be distinguished by the polarity of a particular voltage or of particular voltage pulses, for instance $\pm$ 1. Alternatively, a changeover can be effected between two predetermined voltages, for instance, between 0 and 1. Such a changeover is equivalent to a polarity reversal. As another way of marking the pulses, each one of two adjacent lines may be at a predetermined voltage, for instance, one line may be at zero volts while the other line is at 1 volt, and vice versa. For the purpose of this specification, the term "polarity modulated" pulse series is intended to include all the foregoing and equivalent binary modulating modes known in the art. It will be assumed in all the examples to be described hereinafter that the pulses are characterized by their polarity.

According to one aspect of the invention, the output of one storage stage or unit is connected via a return circuit arrangement to a logical circuit element connected to the input of the storage chain. For instance, in FIG. 3 the output of the storage unit $S_e$ is connected to the return feed circuit R whose construction will be described presently. The output of the return feed circuit R is connected to one input of a logical circuit element M which also receives the control pulses $u$. Advantageously, the logical circuit element M is a product forming circuit, also known as an equivalence circuit, in which the polarity of the output pulses corresponds to the product of the polarities of the received or input pulses — i.e., in the present case, of the returned pulses $r$ and of the control pulses $u$ respectively.

Other possible alternatives are either to connect the outputs of a number of storage units to a return feed circuit having a number of inputs or to connect the logical circuit element M between two storage units instead of to the storage chain or register input, i.e., to supply the logical circuit element with the returned pulses and with the output pulses from that storage unit which immediately precedes the storage unit to whose input is connected the output of the logical circuit element.

Figure 4:
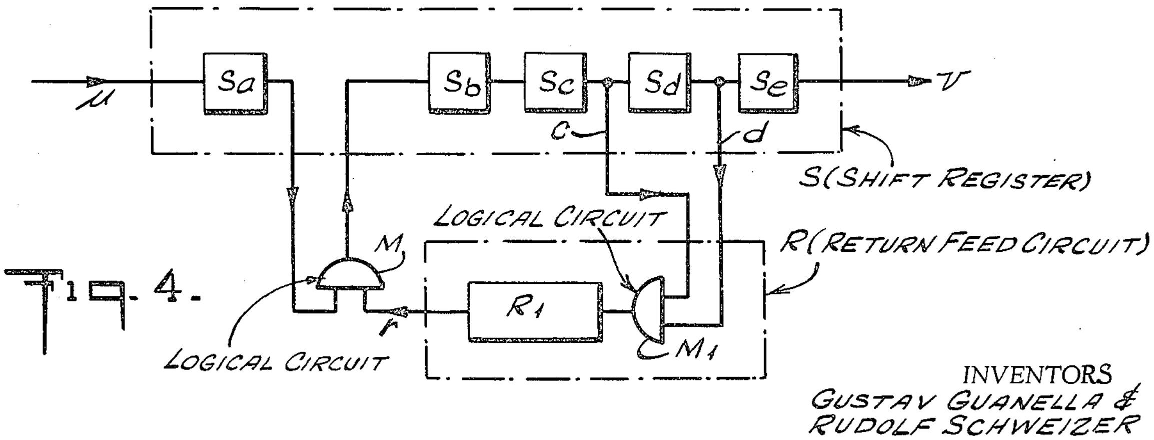

A basic arrangement for these two possibilities is illustrated in FIG. 4. Output pulses $c$ of the storage unit $S_c$ and output pulses $d$ of the storage unit $S_d$ are both applied to the return feed circuit R which comprises a circuit element $R_1$ to be described in greater detail hereinafter and a logical circuit such as an equivalence circuit arrangement $M_1$ having two inputs. In the latter case, the pulses from the circuit arrangement $M_1$ are of a polarity corresponding to the product of the polarities of the supplied pulses $c$ and $d$. The output pulses $r$ from the return feed circuit $R_1$ are applied to a logical circuit element M connected, in the example illustrated, between the storage units $S_a$ and $S_b$. As in the previous case there are input or control pulses $u$ and output or scrambling pulses $v$.

The effect of returning the output pulses of storage units of the register S in FIGS. 3 and 4 to the input of a preceding storage unit is that the polarities of the scrambling pulses $v$ produced by the register S depend not just upon the polarities of a fixed number of control pulses $u$ corresponding to the number of storage units $S_a$, $S_b$ and so on in the storage chain, as in the prior art arrangement according to U.S. Pat. No. 3,077,518, but upon all the control pulses $u$ which have been applied thereto previously. This is due to the repeated and continuous re-cycling of the pulses through the feedback loop, whereby to result in the elimination of absence of any repetitive patterns in the scrambled pulse series suitable to serve as a basis for deciphering the scrambled message by an unauthorized receiver.

In an arrangement of this kind, however, an error pulse in the applied sequence of control pulses $u$, i.e., a pulse having the wrong polarity, can cause an error pulse ad infinitum in the scrambling pulse sequence delivered by the storage chain output as a result of the continuous feedback action. According to the invention, to obviate this disadvantage, the return feed circuit (R in FIG. 3, $R_1$ in FIG. 4) comprises means for preventing an irregular sequence of a fractional number of feedback input pulses from affecting the polarity of the feedback output pulses, or means for suppressing some of the derived pulses. This will result in the suppression of some of the information contained in the returned pulse sequence, so that discrete error pulses which pass through the storage chain a number of times via the return feed circuit are eliminated in the course of time. The polarities of the scrambling pulses produced are in this case dependent not upon the polarities of all the pulses supplied previously to the storage chain but only upon a percentage of such pulses. However, this percentage is very much greater than the number of storage units present in the storage chain or register.

A few embodiments of the return feed circuits including error pulse suppression means will be described hereinafter.

Figure 5:
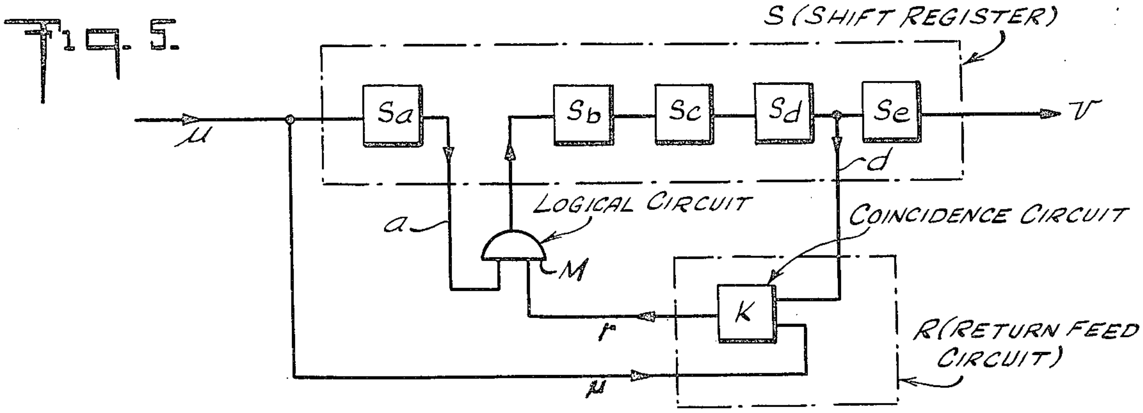
FIG. 5 illustrates an alternative scrambling and unscrambling pulse generator according to the invention.

The digital scrambling system illustrated in FIG. 5 has a return feed circuit R comprising a logical circuit of special type. In this embodiment, the output pulses $d$ of the storage unit $S_d$ are returned and are applied, together with the control pulses $u$, to a coincidence circuit K. The latter is of the type producing an output pulse $r$ of the polarity of the two input pulses, if the latter are of the same polarity, and a output pulse whose polarity is the same as the preceding pulse, if the input polarities are dissimilar. The polarities of some of the pulses $d$ are therefore reversed. In other words, if both a (preceding) pulse $r$ and a pulse $u$ have the same polarity, the circuit K will be disabled in transmitting no information irrespective of the polarity of the applied feedback pulses $d$, whereby to result in the effective elimination or suppression of an error pulse in the series $u$ after a limited number of round trips through the feedback loop. Circuit arrangements having the coincidence functions described, as further explained in Pat. No. 3,077,518 in reference to FIG. 8 thereof, wherein column A represents an equivalence circuit and column E represents a coincidence circuit as defined herein, can be embodied, for instance, in the form of bistable flip-flops. The returned pulses $r$ are applied, in accordance with the basic diagram illustrated in FIG. 3, to the equivalence circuit arrangement M together with the output pulses $a$ from the storage unit $S_a$, the output of the circuit arrangement M being connected to the input of the storage unit $S_b$. The equivalence circuit M can, however, be disposed at some other place before the storage unit $S_d$ in the storage chain S. In the example illustrated in FIG. 5 the control pulses $u$ are used to produce the output pulses $r$ of the coincidence circuit K, but pulses derived elsewhere can be used for this purpose.

Figure 6:
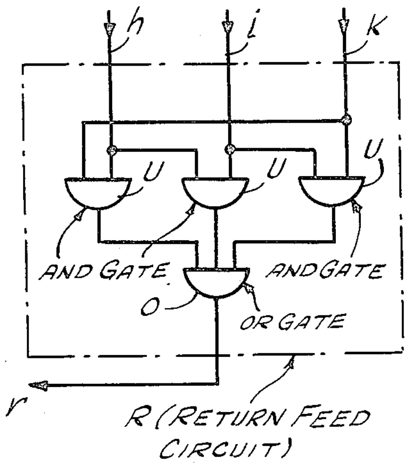
FIG. 6 is a block diagram more clearly showing one of the circuit components of the scrambling pulse generators according to the preceding figures for eliminating the effects of error pulses.

In the example illustrated in FIG. 6, the return feed circuit R has a number of inputs which are supplied simultaneously with the output pulses from a number of storage units and whose own output pulses have the same polarity as the majority of the input pulses. The references $h$, $i$, $k$ denote the output pulses from three storage units of a storage chain S or, more accurately, the lines extending to such outputs. The pulses $r$ are the pulses returned to a preceding storage unit. The return feed circuit comprises, in the example shown, three and-gates U to whose inputs are connected one each of the different pairs of output lines of the storage units. All the outputs of the and-gates are connected to an or-gate O. In this circuit arrangement the output pulses $r$ of the or-gate have the same polarity as the majority of the pulses applied to the and-gates. For instance, if the pulses $h$ and $i$ are of positive polarity, the corresponding output pulse $r$ is also of positive polarity. Consequently, some of the applied pulses have no effect on the polarity of the returned pulses $r$ that is, in other words, some of the applied pulses are suppressed. This means that an error pulse is eliminated over a period of time or number of round trips through the feedback loop.

Figure 7:
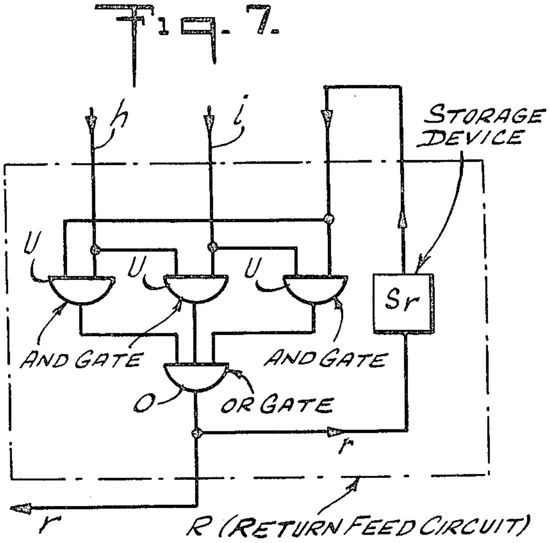
FIG. 7 illustrates a variant of the error pulse suppression means shown by FIG. 6.

A variant of the return feed circuit illustrated in FIG. 6 is shown in FIG. 7, wherein output pulses $h$, $i$ are derived from only two storage units of a storage chain and applied to the three and-gates U. The third pulse sequence required is taken from an auxiliary storage unit $S_r$ which is supplied with the returned output pulses $r$ produced by the arrangement. Consequently, the pulse preceding every output pulse $r$ is stored in the unit $S_r$. The $n$th output pulse $r_n$, therefore, has the same polarity as the pulses $h$ and $i$ if the latter are of the same polarity. In all other cases the output pulse $r_n$ has the polarity of the preceding pulse $r_{n-1}$. In this case too, some of the pulses applied to the arrangement do not affect the polarity of the returned pulses.

Figure 8:
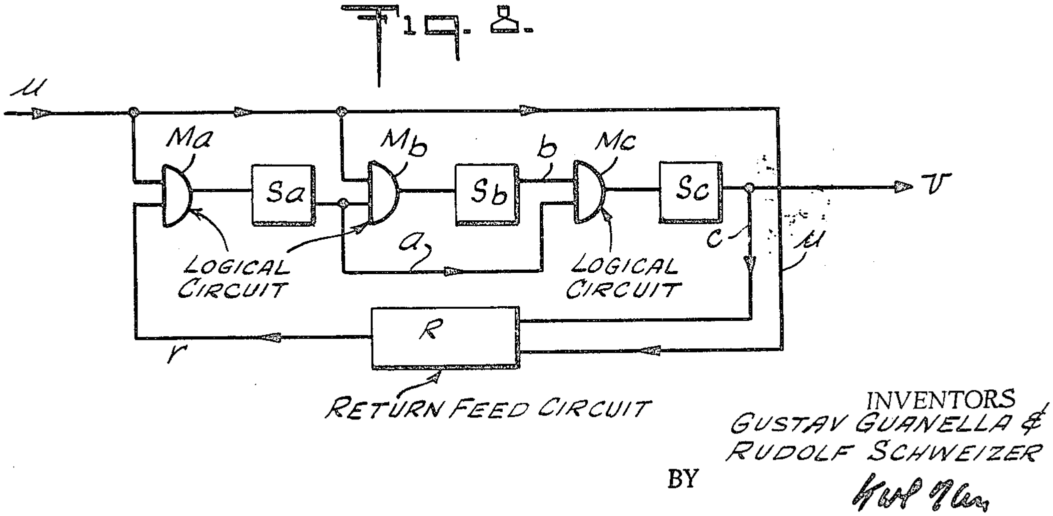
FIG. 8 illustrates still another scrambling pulse generator system constructed in accordance with the invention.

FIG. 8 shows one example of how the return feed circuit in FIG. 7 can be used. In this digital scrambling device equivalence circuit arrangements $M_a$, $M_b$, $M_c$ which are conveniently combined with the storage units to form one constructional unit, are connected to the input of the storage units $S_a$, $S_b$, $S_c$. The first equivalence circuit arrangement $M_a$ is supplied with the control pulse $u$ and the returned pulses $r$, the second equivalence circuit arrangement $M_b$ is supplied with the control pulses $u$ and the output pulses from the first storage unit $S_a$, and the third equivalence circuit arrangement $M_c$ is supplied with the output pulses from the second storage unit $S_b$ with the output pulses from the first storage unit $S_a$. The return feed circuit R is devised as illustrated in FIG. 7, the applied pulse sequences ($h$ and $i$ in FIG. 7) being the output pulses $c$ from the third storage unit $S_c$ and the control pulses $u$. This circuit arrangement can, if desired, be further amplified, for instance, by a number of storage units being provided after each equivalence circuit arrangement. The circuit provides great reliability against repetitive patterns occurring in time of the scrambling pulse sequence $v$ produced.

The tables given in FIGS. 9$a$ and 9$b$ demonstrate how an error pulse occurring in the device illustrated in FIG. 8 is eliminated after a short time. In these tables $n$ denotes the sequence of polarity patterns of the arrangement, so that $n = 0$ denotes the initial pattern, $n = 1$ denotes the pattern after the first control pulse to arrive, and so on. The column $u$ lists the arbitrarily assumed polarities of the control pulses, and the other columns give the polarities of the returned pulses $r$ and the polarities of the output pulses $a$, $b$, $c$ from the storage units $S_a$, $S_b$, $S_c$, the last-mentioned polarities being the result of the logical connections of $M_a$, $M_b$ and $M_c$. The initial pattern or sequence for $n = 0$ is assumed arbitrarily in the table in FIG. 9$a$, whereas in the table given in FIG. 9$b$ the initial pattern is assumed to be different because of an error pulse, the error pulse being ringed by a circle for identification in each column. Wrong instantaneous values produced stepwise by the error pulse are also ringed with a circle. Clearly, the effect of the error pulse ceases after only a few steps when the pattern is the same in the two tables. In other words, the error pulse suppression means of the invention acts to prevent a polarity change of a limited number of return feed pulses applied to the register, whereby an error pulse will be suppressed or "trapped" after a relatively small number of rounds through the feedback loop.

FIGS. 10 and 11 illustrate alternative embodiments of a return feed and error suppressing circuit, the same comprising gating circuits or devices. In this embodiment, the return feed circuit R comprises at least two oppositely controlled gating circuits or devices, at least one of which has its input connected to the output of a storage unit of the storage chain S, auxiliary control pulses for affecting the gating circuits being produced by a logical circuit element whose input is also connected to the output of at least one other unit of the storage chain.

In FIG. 10 there are two gating circuits $T_1$, $T_2$ for pulse sequences $p$, $q$ respectively, derived from the outputs of two units of a storage chain S. These pulse sequences are re-applied alternately to the storage chain as returned pulse sequences $r$ in the manner hereinbefore described, depending upon which of the two gating circuits is open. These gating circuits are in turn controlled by auxiliary control pulses $s$ produced in a logical circuit element $M_s$. The latter is, with advantage, an equivalence circuit arrangement receiving the two output pulse sequences $h$, $i$ of two other units of the storage chain S. As a consequence, the auxiliary control pulses $s$ are of positive polarity when the polarities of the pulses $h$ and $i$ are the same, and of negative polarity when the polarities of the pulses $h$, $i$ are dissimilar. Let it be assumed that circuit $T_1$ opens for positive pulses $s$ and circuit $T_2$ opens for negative pulses $s$ so that a pulse $p$ or $q$ is returned to the storage chain in accordance with the polarities of the pulses $h$, $i$. One of the two returned pulses, $p$, $q$ is therefore always suppressed, and so any error pulse passing through the storage chain and the return feed circuit will be eliminated in time.

FIG. 11 illustrates a variant of the arrangement illustrated in FIG. 10. In FIG. 11, one each of the pulse sequences $h$, $i$ which are returned or which serve to produce auxiliary control pulses is replaced by at least one storage unit. In this case, therefore, the equivalence circuit arrangement $M_s$ receives the pulses $h$ taken from one unit of the storage chain and the output pulses of the storage unit $S_s$ receive the same pulses $h$. At a particular time, therefore, a pulse $h_n$ and, for instance, the immediately previous pulse $h_{n-1}$ are present at the input of the equivalence circuit arrangement $M_s$. The gating circuit $T_2$, instead of being arranged as in FIG. 10 for a second pulse sequence $q$, is arranged for the pulse sequence delivered at the output of the memory unit $S_r$ receiving the returned pulses $r$. It will be assumed that the returned pulse $r_n$ is present at a particular time. The immediately previous returned pulse $r_{n-1}$ is therefore simultaneously present at the input of the gating circuit $T_2$.

The operation of the afore-described arrangement is as follows:

If the pulses $h_n$ and $h_{n-1}$ are of like polarity, the circuit $T_1$ is open so that the simultaneously present pulse $p_n$ is transmitted and is returned to the storage chain as a pulse $r_n$. In this case, therefore, there is no pulse loss. If the polarities of the pulses $h_n$ and $h_{n-1}$ are dissimilar, the gating circuit $T_2$ is open, so that the immediately previous pulse $r_{n-1}$ taken from the storage unit $S_r$ is returned to the storage chain as a pulse $r_n$. The pulse $p_n$ which is produced simultaneously is suppressed.

Instead of the equivalence circuit arrangement $M_s$ illustrated in FIGS. 10 and 11, the logical circuit element can take the form of a circuit arrangement of the kind illustrated in FIGS. 6 or 7 in which the polarity of the output pulse corresponds to the polarity of majority of the input pulses h, i and possibly of other pulses. Alternatively, the logical circuit element can be a coincidence circuit which produces an output pulse of a predetermined polarity in the event of coincidence between the input pulses $h$ and $i$.

As a further convenient way of reducing repetitive patterns in the scrambling pulse sequence $v$, a number of digital scrambling devices according to the invention can be provided wherein the outputs of a number of storage units of at least one storage chain are connected to the inputs of one storage unit each of another storage chain. Advantageously, in addition to output pulses from each storage chain being returned to the input of the same chain, the outputs of at least one storage unit each of at least two storage chains are connected to the input of a return feed circuit whose output is connected to the input of a storage unit of the storage chain to which the control pulses are applied.

An arrangement of this kind is illustrated in FIG. 12 which comprises two arrangements $S_1$ and $S_2$ combined with storage chains and return feed circuits, and respective permuting switches $P_1$ and $P_2$ respectively. Each storage chain has storage units $S_{1a}$ to $S_{1e}$ and $S_{2a}$ to $S_{2e}$ in series with equivalence circuit arrangements $M_{1a}$ to $M_{1d}$ and $M_{2a}$ to $M_{2e}$, respectively. Return feed circuits $R_1$, $R_2$, respectively, to whose outputs further storage units $S_{1f}$ and $S_{2f}$, respectively, are connected are, in turn, connected to the outputs of the last storage units $S_{1e}$ and $S_{2e}$, respectively, of the storage chains $S_1$ and $S_2$. The output pulses $r_1$ and $r_2$ are returned to the input of the respective storage chains $S_1$ and $S_2$. The return feed circuits $R_1$, $R_2$ are constructed, for instance, as illustrated in FIG. 7.

In the combined storage chain and return feed circuit $S_1$ the equivalence circuit arrangement $M_{1a}$ is supplied with the control pulse sequence $u$ and the returned pulse sequence $r_1$, the equivalence circuit arrangement $M_{1b}$ is supplied with a return pulse sequence $r_3$ to be described presently in greater detail and with the output pulse sequence of the immediately preceding storage unit $S_{1a}$, the equivalence circuit arrangement $M_{1d}$ is supplied with the control pulse sequence $u$ and with the output pulse sequence from the immediately preceding storage unit $S_{1c}$, and the return feed circuit $R_1$ is supplied with the control pulse sequence $u$ and with the output pulse sequence of the immediately preceding storage unit $S_{1e}$. All the output pulse sequences $a_1$ to $f_1$ of the storage units $S_{1a}$ to $S_{1f}$ are taken to a permuting switch or system $P_1$ whence they pass selectively to the various equivalence circuit arrangements $M_{2a}$ to $M_{2f}$ of the combined storage chain and return feed circuit $S_2$. The inputs of the latter equivalence circuit arrangements are also connected to the outputs of the respective immediately preceding storage units $S_{2b}$ to $S_{2f}$. The storage unit $S_{2a}$ receives, as the second input pulse sequence, the sequence of the pulses $r_2$ which are supplied via the circuit arrangement $M_{2e}$ and which are returned from the output of the last storage unit $S_{2f}$.

The output pulse sequences $a_2$ to $f_2$ of the storage units $S_{2a}$ to $S_{2f}$ pass to another permuting switch $P_2$ whence they are either supplied in any sequence for further processing, for instance, to a subsequent combined storage chain and return feed circuit, or are used as final scrambling pulses $V_1$–$V_6$ to scramble a number of information channels.

The two combined storage chain and return feed circuits $S_1$ and $S_2$ are interconnected by another return channel. To this end, a return circuit arrangement $R_3$ is provided which receives output pulses from the two storage chains and whose output pulse sequence $r_3$ is applied to the input of the equivalence circuit arrangement $M_{1b}$ to affect the polarity of the control pulses $u$. In the example illustrated, the return circuit arrangement $R_3$ is embodied similarly to what is shown in FIG. 10, the required pulse sequences $h$, $i$ and $p$, $q$ being taken, via the respective permuting systems $P_1$, $P_2$ respectively, from the units of the storage chains at choice.

In the foregoing the invention has been described in reference to a number of specific illustrative arrangements or embodiments. It will be evident, however, that variations and modifications, as well as the substitution of equivalent circuits or devices for those shown and described for illustration, may be made without departing from the broader spirit and purview of the invention as defined by the appended claims. The specification and drawings are accordingly to be regarded in an illustrative rather than in a restrictive sense.

We claim:

1. In combination, a secrecy signaling system for transmitting a polarity modulated message pulse series from a transmitting station to a receiving station including scrambling pulse generating means at both said stations, to produce a pair of identical scrambling pulse series, for scrambling and unscrambling, respectively, said message pulse series, scrambling pulse converting means at each of said stations to convert a scrambling control pulse series of arbitrarily varying polarity into a final scrambling pulse series, said converting means comprising a pulse shift register having a plurality of cascade-connected pulse storage stages and an input fed by said control pulse series, at least one feedback circuit connecting the output of a first one of said stages to the input of a second preceding stage of said register, and at least one logical circuit interposed in the path of said feedback circuit, to produce final scrambled pulses at the output of said register.

2. In a secrecy signaling system as claimed in claim 1, said logical circuit having a pair of inputs and an output, said output being connected to the input of said second stage and said inputs being connected, respectively, to the output of said first stage through said feedback circuit and to the circuit preceding said second register stage.

3. In a secrecy signaling system as claimed in claim 2, said logical circuit being of the type producing an output polarity determined by the product of the polarities of the applied input pulses.

4. In a secrecy signaling system as claimed in claim 1, said scrambling control pulse series being produced and applied by single control pulse generator to both said transmitting and receiving stations.

5. In a secrecy signaling system as claimed in claim 1, said scrambling control pulse series being derived, at both said transmitting and receiving stations from the transmitted and received scrambled message pulse series, respectively.

6. In combination, a secrecy signaling system for transmitting a polarity modulated message pulse series from a transmitting station to a receiving station including scrambling pulse generating means at both said stations, to produce a pair of identical scrambling pulse series, for scrambling and unscrambling, respectively, said message pulse series, scrambling pulse converting means at each of said stations, to convert a scrambling control pulse series of arbitrarily varying polarity into a final scrambling pulse series, said converting means comprising a pulse shift register having a plurality of cascade-connected pulse storage stages and an input fed by said control pulse series, at least one feedback circuit connecting the output of a first one of said stages to the input of a second preceding stage of said register, at least one logical circuit interposed in the path of said feedback circuit, to produce final scrambled pulses at the output of said register, and further means inserted in said feedback circuit effective to prevent a polarity change of an irregular sequence of a fractional number of the feedback pulses derived from said first stage and applied to said second stage of said register.

7. In a secrecy signaling system as claimed in claim 6, said last means being comprised of a further logical circuit having a pair of inputs and an output, the polarity of the output pulses of said circuit corresponding, respectively, to the polarities of the input pulses if equal to one another and to the polarity of the preceding output pulse if the input polarities differ from one another, said output being connected to said second stage through said first logical circuit and one of said inputs being connected to the output of said first stage, and further means to apply control pulses to the remaining input of said further logical circuit.

8. In a secrecy signaling system as claimed in claim 7, said last control pulses being derived from said scrambling control pulse series.

9. In a secrecy signaling system as claimed in claim 6, said first logical circuit having a pair of inputs and an output, said inputs being fed, respectively, by the circuit preceding said second stage and by the output of said feedback circuit, and said output being connected to the input of said second stage.

10. In a secrecy signaling system as claimed in claim 6, said last means being comprised of a pair of oppositely controlled gates having a common output circuit connected to said second register stage, the input of at least one of said gates being connected to said first register stage, and means to simultaneously control both said gates by signals derived via a further logical circuit from said register.

11. In a secrecy signaling system as claimed in claim 10, said last-mentioned logical circuit having a pair of inputs connected to one stage of said register directly and indirectly through a delay device, respectively, and the inputs of said gates being derived, respectively, from another stage of said register and the output of said feedback circuit via a delay device.

12. In a secrecy signaling system comprising a plurality of shift registers and associated feedback circuits according to claim 6, connected in cascade at least one of said registers being fed by said control pulse series and the remaining registers being fed from a preceding register, and multiple circuit connections including logical circuit means between the stages of one of said registers to the input stages of another register.

13. In a secrecy signaling system as claimed in claim 12, including permuting switch means operably associated with said last-mentioned circuit connections.

14. In a secrecy signaling system as claimed in claim 12, including further feedback means interconnecting at least one of said registers with a preceding register.

15. In combination, a secrecy signaling system for transmitting a polarity modulated message pulse series from a transmitting station to a receiving station including scrambling pulse generating means at both said stations, to produce a pair of identical scrambling pulse series, for scrambling and unscrambling, respectively, said message pulse series, scrambling pulse converting means at both said stations to convert a scrambling control pulse of arbitrary varying polarity into a final scrambling pulse series, said converting means comprising a pulse shift register having a plurality of cascade-connected pulse storage stages and an input fed by said control pulse series, and a feedback circuit connecting the outputs of a plurality of stages of said register with the input of a preceding register stage, said feedback circuit including a logical circuit having a plurality of inputs each connected to one of said first-mentioned register stages and having an output connected to said preceding register stage, said logical circuit being of the type to produce an output polarity corresponding to the majority of the polarities of the input pulses applied thereto.

16. In a secrecy signaling system as claimed in claim 15, said logical circuit being comprised of a plurality of and-gates each having two inputs fed by different pairs of a predetermined number of stages of said register, and an or-gate having its imputs fed each by one of the outputs of said and-gates and having its output applied to the input of said preceding register stage.

17. In a secrecy signaling system as claimed in claim 16, one of the inputs of said and-gates being derived from the output of said feedback circuit through a pulse delay device.

* * * * *